(12) United States Patent
Glaab

(10) Patent No.: US 10,829,079 B2
(45) Date of Patent: Nov. 10, 2020

(54) GAS BAG FOR AN AIRBAG MODULE OF A MOTOR VEHICLE

(71) Applicant: JOYSON SAFETY SYSTEMS GERMANY GMBH, Aschaffenburg (DE)

(72) Inventor: Ralf Glaab, Krombach (DE)

(73) Assignee: JOYSON SAFETY SYSTEMS GERMANY GMBH, Aschaffenburg (DE)

( * ) Notice: Subject to any disclaimer, the term of this patent is extended or adjusted under 35 U.S.C. 154(b) by 36 days.

(21) Appl. No.: 16/322,790

(22) PCT Filed: Jul. 27, 2017

(86) PCT No.: PCT/EP2017/069085
§ 371 (c)(1),
(2) Date: Feb. 1, 2019

(87) PCT Pub. No.: WO2018/024613
PCT Pub. Date: Feb. 8, 2018

(65) Prior Publication Data
US 2019/0193664 A1    Jun. 27, 2019

(30) Foreign Application Priority Data

Aug. 2, 2016 (DE) .......................... 10 2016 114 278

(51) Int. Cl.
*B60R 21/231* (2011.01)
(52) U.S. Cl.
CPC .. *B60R 21/231* (2013.01); *B60R 2021/23123* (2013.01)
(58) Field of Classification Search
CPC .................... B60R 21/231; B60R 2021/23123
See application file for complete search history.

(56) References Cited

U.S. PATENT DOCUMENTS 5,226,671 A * 7/1993 Hill .......................... B60R 21/23
280/743.1
6,086,096 A   7/2000 Link et al.
(Continued)

FOREIGN PATENT DOCUMENTS

DE      43 15 142 A1    11/1994
DE    298 00 444 U1     6/1998
(Continued)

OTHER PUBLICATIONS

"Airbag Module Construction"; Research Disclosure; Kenneth Mason Publications; Hampshire, UK GB; Jan. 1, 1997; No. 393; p. 26; XP000693672; ISSN; 0374-4353.
(Continued)

*Primary Examiner* — Drew J Brown
(74) *Attorney, Agent, or Firm* — Gordon Rees Scully Mansukhani, LLP

(57) ABSTRACT

It is provided a gas bag for an airbag module of a motor vehicle, comprising at least two gas bag parts, which via at least one seam are connected to each other to form a gas bag to be filled with gas, so that the resulting gas bag has an inner wall facing the interior of the gas bag and an outer wall facing away therefrom, and comprising a flame protection layer that is arranged within the gas bag and is connected to the gas bag such that the flame protection layer sectionally covers the gas bag for protection against gases. In the flame protection layer at least one incision is formed, by which a foldable partial section is produced in the flame protection layer, which can be folded over a seam by means of which the gas bag parts are connected to each other.

15 Claims, 2 Drawing Sheets

(56) References Cited

U.S. PATENT DOCUMENTS

| | | |
|---|---|---|
| 6,217,067 B1 | 4/2001 | Derrick |
| 6,334,625 B1 | 1/2002 | Pausch et al. |
| 6,361,067 B1 | 3/2002 | Varcus et al. |
| 2003/0151233 A1* | 8/2003 | Varcus ............... B60R 21/2346 280/729 |
| 2003/0222446 A1* | 12/2003 | Soderquist ........... B60R 21/233 280/743.1 |
| 2006/0267324 A1 | 11/2006 | Britz et al. |
| 2007/0085305 A1* | 4/2007 | Feller .................... B60R 21/231 280/728.2 |
| 2008/0224457 A1* | 9/2008 | Brough ............... B60R 21/2346 280/730.2 |
| 2008/0290640 A1* | 11/2008 | Ford .................... B60R 21/231 280/743.2 |
| 2010/0133796 A1* | 6/2010 | Mizuno ................ B60R 21/235 280/743.1 |
| 2016/0152207 A1* | 6/2016 | Jahme .................. B60R 21/264 280/743.1 |

FOREIGN PATENT DOCUMENTS

| | | |
|---|---|---|
| DE | 197 27 832 A1 | 12/1998 |
| DE | 198 58 690 A1 | 6/2000 |
| DE | 20 2005 008 147 U1 | 10/2005 |
| EP | 1 044 854 B1 | 10/2005 |
| FR | 2 767 763 A1 | 3/1999 |
| GB | 2 389 822 A | 12/2003 |
| JP | 2004-231042 A | 8/2004 |
| JP | 2009-12502 A | 1/2009 |

OTHER PUBLICATIONS

International Preliminary Report on Patentability dated Feb. 14, 2019 and Written Opinion dated Oct. 25, 2017 issued in International Application No. PCT/EP2017/069085; filed Jul. 27, 2017.

* cited by examiner

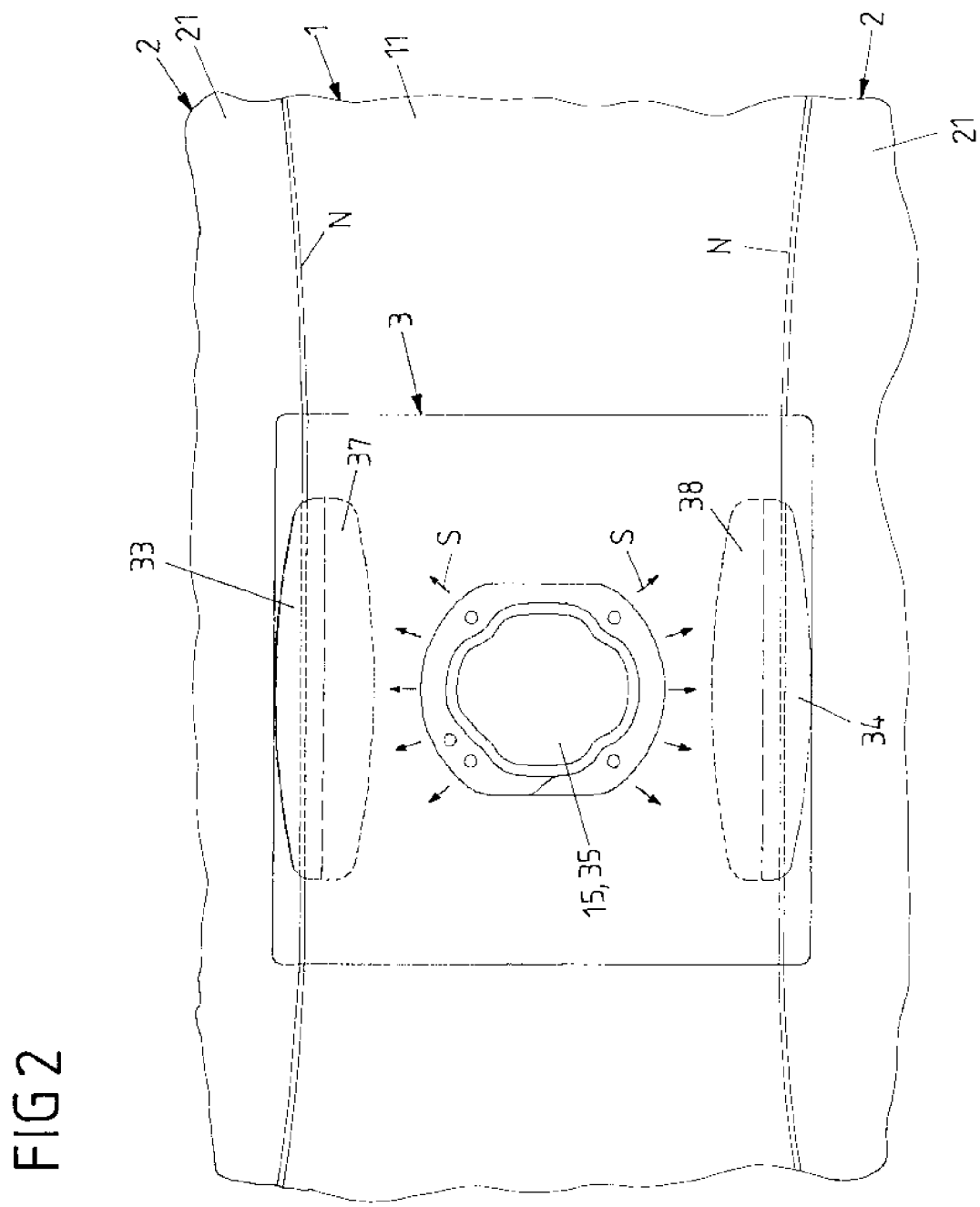

GAS BAG FOR AN AIRBAG MODULE OF A MOTOR VEHICLE

REFERENCE TO RELATED APPLICATION

This application is a National Phase Patent Application of International Patent Application Number PCT/EP2017/069085, filed on Jul. 27, 2017, which claims priority of German Patent Application Number 10 2016 114 278.6, filed on Aug. 2, 2016.

BACKGROUND

This disclosure relates to a gas bag for an airbag module of a motor vehicle.

Such a gas bag comprises at least two gas bag parts or gas bag layers, for example in the form of two fabric layers, which for forming a gas bag to be filled with gas are connected to each other via at least one seam such that the resulting gas bag formed of the gas bag parts has an inner wall facing the interior space of the gas bag and an outer wall facing away therefrom. This means that the inner wall of the gas bag delimits the interior space of the gas bag to be filled with gas; and when the gas bag is properly mounted in a motor vehicle, the outer wall of the gas bag faces the passenger cell or concretely a vehicle occupant to be protected. Furthermore, a flame protection layer is provided, which—in particular as a part separate from the at least two gas bag parts—is arranged within the gas bag and is connected to the same, namely such that the flame protection layer sectionally covers the inner wall of the gas bag for protection against gases entering on inflation of the gas bag.

The use of such flame protection layers in a gas bag for an airbag module is known and regularly provided in particular when for inflating the gas bag a so-called hot gas source, i.e. a gas generator is provided, which on activation (ignition) generates hot gases for inflating a gas bag by a chemical reaction. The flame protection layer is placed such that it covers in particular those areas of the inner wall of the gas bag with which the gases entering the gas bag first get in contact.

Beside the protection of material areas of a gas bag against hot gases, which can impinge there on inflation of the gas bag, the protection of the seams also plays a role, via which the gas bag parts are connected to each other to form the gas bag. For this purpose, different additional measures are known from the prior art, such as for example the doubling of seams or the attachment of an additional protective layer over particularly endangered seam areas.

EP 1 044 854 B1 describes a gas bag for an airbag module, in which additional protective areas are provided in the form of free ends of a protective layer in order to cover individual seam areas of the gas bag.

From GB 2 389 822 B a gas bag for an airbag module is known, in which from at least one of the gas bag parts, from which the gas bag is formed by sewing, a pocket is formed in order to accommodate certain seam areas.

The aforementioned approaches for the protection of the seam of a gas bag have the disadvantage that specific, additional material expenses and fabrication steps are necessary when manufacturing a gas bag from individual gas bag parts, in order to protect seam areas of a gas bag.

SUMMARY

It is a problem underlying the proposed solution to improve a gas bag as mentioned above in that with simple means a protection of certain seam areas of the gas bag becomes possible.

This problem is solved by creating a gas bag for an airbag module of a motor vehicle with features as described herein.

Accordingly, at least one incision is formed in the flame protection layer, which serves to protect a part of the inner wall of the gas bag, by which a foldable partial section is produced in the flame protection layer, which can be folded over a seam area of the gas bag to be protected.

The incision is guided such that the resulting partial section of the flame protection layer is seized by the gases properly entering the gas bag on inflation of the gas bag and is folded or placed over the seam area to be protected.

When folding over that partial section of the flame protection layer, a (circumferentially bordered) opening is newly formed in the latter, namely at the point at which the partial section of the flame protection layer was disposed before folding over (without already covering the seam to be protected).

With the solution, the protection of at least one seam area of a gas bag becomes possible without having to use any additional material therefor, which already covers the respective seam before inflating the gas bag. Rather, on inflation of the gas bag a partial section of the protective layer formed by an incision of the protective layer can be folded over such that it lays itself over the seam to be protected only on inflation of the gas bag. For this purpose, the incision can extend along a non-linear path and in particular along a curve-shaped path.

In a gas bag with a blow-in opening that is equipped to sectionally accommodate a gas generating device provided for inflating the gas bag, so that gases generated by means of the gas generating device can flow into the gas bag, a flame protection layer regularly is arranged within the gas bag in the region of the blow-in opening. In the region of the blow-in opening of a gas bag the entering gas has the comparatively highest temperature directly after leaving the gas generating device. The flame protection layer serving to protect the material of the gas bag then can also be provided to protect seams in the region of the blow-in opening by means of the incision.

The flame protection layer can include an assembly opening aligned with the blow-in opening; and it can be fixed to the gas bag in the region of the blow-in opening.

According to a development, the flame protection layer has two incisions that are formed on both sides of the blow-in opening in order to each define there a foldable partial section of the flame protection layer, which can lay itself over a seam to be protected.

Furthermore, to produce a connection with the gas bag, the flame protection layer can be sewn to at least one gas bag part of the gas bag, namely in particular via that seam or those seams via which the at least two gas bag parts also are connected to each other to form the gas bag.

The flame protection layer for example can be formed of a fabric (coated or uncoated) and/or of a non-woven material (e.g. a film or a non-woven fabric). As a material for the woven or non-woven material for example a plastic material can be used. For example, a fabric made of PET or PA (such as PA6.6, 18×18, 470 dtex), in particular with a silicone coating, is used. In particular, the gas bag parts and the flame protection layer are formed of the same material.

BRIEF DESCRIPTION OF THE DRAWINGS

Further details and advantages of the solution will become apparent from the following description of an exemplary embodiment with reference to the Figures.

FIG. 2 shows the arrangement of FIG. 1, while gas flows into the gas bag.

DETAILED DESCRIPTION

Figure 1:
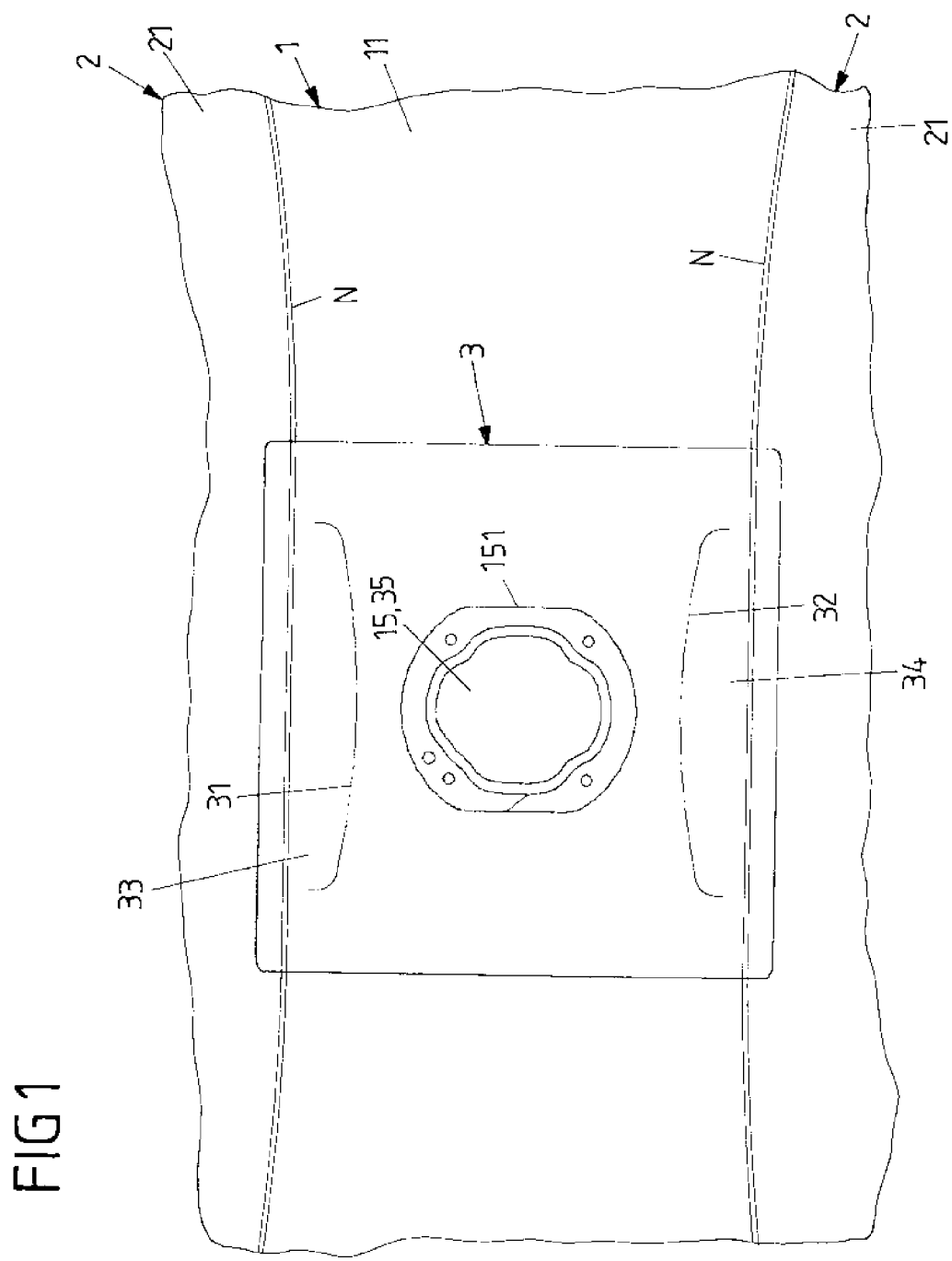
FIG. 1 shows a gas bag part of a gas bag for an airbag module with a flame protection layer.

FIG. 1 sectionally shows a first gas bag part 1 and a second gas bag part 2, in particular each in the form of a gas bag layer (e.g. fabric layer) of a gas bag of an airbag module for a motor vehicle. For forming a gas bag to be filled with gas, the gas bag parts 1, 2 are connected to each other along their edge via at least one seam N (by sewing).

In the sewn condition, as shown in FIG. 1, the two gas bag parts 1, 2 form a gas bag that encloses an interior space to be filled with gas. FIG. 1 concretely relates to a representation of a section of the first gas bag part 1 as seen from the interior space of the gas bag, wherein of the second gas bag part 2 connected thereto merely the partial areas directly adjoining the connecting seam N are taken into account.

Correspondingly, FIG. 1 shows a view of the inner wall 11, 21 of the gas bag facing the interior space of the gas bag. The opposite side (not visible in FIG. 1) of the gas bag parts 1, 2 (rear side) on the other hand forms the outer wall of the gas bag, which when the gas bag is properly arranged in a motor vehicle faces the passenger cell or concretely a vehicle occupant to be protected.

As can furthermore be seen in FIG. 1, a so-called flame protection layer 3 is arranged in the interior of the gas bag and attached to the gas bag. The flame protection layer 3 is a part separate from the two gas bag parts 1, 2 (an additional part), which enclose and delimit the interior space of the gas bag.

The flame protection layer 3 can be formed for example by a (e.g. coated) fabric, a non-woven fabric or a film.

The flame protection layer 3 is arranged in the gas bag and attached to the same such that a partial area of the inner wall 11, 21 of the gas bag is covered therewith and thereby in particular is protected against hot gases that enter the gas bag when the same is inflated. In the present case, the flame protection layer 3 covers a portion of the inner wall 11 of the first gas bag part 1.

The flame protection layer 3 is arranged in the region of a blow-in opening 15 of the gas bag, which in the exemplary embodiment is formed in the first gas bag part 1. The blow-in opening 15 serves to accommodate a gas generating device that protrudes into the interior of the gas bag through that blow-in opening 15, so that gas generated in the gas generating device can flow into the gas bag to inflate the same. It is not necessary that the blow-in opening 15 accommodates such elements of the gas generating device which directly serve the gas generation itself, such as for example a combustion chamber in which a gas is generated from a pyrotechnical charge by means of a chemical reaction. Rather, it can be sufficient when a diffusor associated with the gas generator or a gas conducting tube proceeding therefrom protrudes into the interior of the gas bag through the blow-in opening 15 in order to be able to fill said gas bag with gas upon activation of the gas generator.

As in the moment of exiting from the gas generating device into the interior of the gas bag the gases have their comparatively highest temperature within the gas bag, the arrangement of a flame protection layer 3 especially in the region of the blow-in opening 15 of the gas bag is of particular importance.

For a defined coverage of the inner wall 11, 21 of the gas bag or in the exemplary embodiment concretely of the inner wall 11 of the first gas bag part 1 in the region of the blow-in opening 15, the flame protection layer 3 is attached to the gas bag in a defined way. For this purpose, an attachment adjacent to the blow-in opening 15 on the one hand is effected via a seam 151. Furthermore, an attachment of the flame protection layer 3 to the edge of the gas bag is effected by means of that at least one seam N via which the two gas bag parts 1, 2 also are connected to each other to form the gas bag and to delimit the gas bag interior.

According to FIG. 1, the flame protection layer 3 furthermore includes an assembly opening 35 covering the blow-in opening 15 of the gas bag (in alignment) so that the flame protection layer 3 does not impede the introduction of a part of the gas generating device into the interior of the gas bag.

In the present case, at least one incision 31 also is formed on the flame protection layer 3, in the exemplary embodiment concretely two incisions 31, 32. A respective incision 31, 32 in the flame protection layer 3 is arranged and configured such that a foldable partial section 33, 34 thereby is generated in the flame protection layer 3. For this purpose, a respective incision 31, 32 of the flame protection layer 3 is of non-linear, in particular approximately arc-shaped design.

The two incisions 31, 32 are provided on both sides of the blow-in opening 15 of the gas bag 1.

Furthermore, a respective incision 31, 32 is formed on the flame protection layer 3 such that the foldable partial section 33, 34 of the flame protection layer 3 generated by the respective incision 31, 32 is arranged adjacent to a region of the seam N via which the two gas bag parts 1, 2 are connected to each other. A respective partial section 33, 34 of the flame protection layer 3 formed by an associated incision 31, 32 thereby can be folded over a region of the adjacent seam N in order to cover the same and protect it against hot gases.

FIG. 2 shows the flame protection layer 3 of FIG. 1 in a condition in which (in the region of the blow-in opening 15 and the assembly opening 35) a gas stream S flows into the interior of the gas bag. The gas stream S acts on the respective foldable partial section 33, 34 of the protective layer 3 on the associated incision 31, 32 and folds the corresponding partial section 33, 34 over a partial area of the respectively adjacent seam N. This is effected by forming one (completely bordered) opening 37, 38 each in the flame protection layer 3, namely at the point at which the respective foldable partial section 33, 34 of the flame protection layer 3 was disposed before folding over.

This means that the partial sections 33, 34 of the flame protection layer 3, which serve to protect a respective partial area of the seam N, in the present case are not formed by additional portions protruding from the flame protection layer 3, but rather each by one (inner) partial section 33, 34 of the flame protection layer 3, which before the inflow of gas into the interior of the gas bag initially covers the inner wall 11, 21 of the gas bag outside the seam N and only under the influence of the entering gas—by forming an opening 37, 38 in the flame protection layer 3—is folded over the respective seam N in order to sectionally cover the same.

The invention claimed is:

1. A gas bag for an airbag module of a motor vehicle, comprising
    at least two gas bag parts, which are connected to each other via at least one seam to form a gas bag to be filled with gas, so that the resulting gas bag has an inner wall facing the interior of the gas bag and an outer wall facing away therefrom, and a flame protection layer, which is arranged within the gas bag and is connected to the gas bag such that the flame protection layer sectionally covers the inner wall of the gas bag for protection against entering gases, wherein in the flame protection layer at least one incision is formed, by which a foldable partial section is produced in the flame protection layer, which can be folded over a seam by means of which the gas bag parts are connected to each other.

2. The gas bag according to claim 1, wherein the flame protection layer is arranged within the gas bag as a part separate from the gas bag parts.

3. The gas bag according to claim 1 or 2, wherein the at least one incision is arranged and guided on the flame protection layer such that the foldable partial section is folded over the seam by the gases entering into the gas bag when properly inflating the gas bag.

4. The gas bag according to claim 1, wherein the at least one incision of the flame protection layer is guided non-linearly.

5. The gas bag according to claim 4, wherein the at least one incision of the flame protection layer is guided in the form of an arc.

6. The gas bag according to claim 1, wherein when folding over the foldable partial section of the flame protection layer over the seam a circumferentially bordered opening is formed in the flame protection layer.

7. The gas bag according to claim 1, wherein before being folded over the seam the foldable partial section of the flame protection layer does not yet cover the latter.

8. The gas bag according to claim 1, wherein the gas bag includes a blow-in opening that is equipped to accommodate a gas generating device by means of which a gas for filling the gas bag can be generated, and that the flame protection layer is arranged in the surroundings of the blow-in opening.

9. The gas bag according to claim 8, wherein the flame protection layer includes an assembly opening that is in alignment with the blow-in opening.

10. The gas bag according to claim 1, wherein the flame protection layer includes two incisions for forming one foldable partial section each.

11. The gas bag according to claim 8, wherein the flame protection layer includes two incisions for forming one foldable partial section each, wherein the two incisions are arranged on both sides of the blow-in opening.

12. The gas bag according to claim 8, wherein the flame protection layer is fixed at the edge of the blow-in opening.

13. The gas bag according to claim 1, wherein the flame protection layer is sewn to at least one of the gas bag parts.

14. The gas bag according to claim 1, wherein the flame protection layer is connected to the gas bag via at least one seam via which the two gas bag parts also are connected to each other.

15. The gas bag according to claim 1, wherein the flame protection layer consists of a coated fabric, an uncoated fabric, a non-woven fabric and/or a film.

* * * * *